(12) United States Patent
Stuppy

(10) Patent No.: US 6,749,434 B2
(45) Date of Patent: Jun. 15, 2004

(54) SYSTEM AND METHOD FOR CONDUCTING A LEARNING SESSION USING TEACHER AND STUDENT WORKBOOKS

(75) Inventor: John J. Stuppy, Alexandria, VA (US)

(73) Assignee: Sylvan Learning Systems, Inc., Baltimore, MD (US)

( * ) Notice: Subject to any disclaimer, the term of this patent is extended or adjusted under 35 U.S.C. 154(b) by 0 days.

(21) Appl. No.: 10/355,046

(22) Filed: Jan. 31, 2003

(65) Prior Publication Data

US 2003/0198931 A1 Oct. 23, 2003

Related U.S. Application Data

(63) Continuation of application No. 09/678,030, filed on Oct. 3, 2000, now Pat. No. 6,592,379, which is a continuation of application No. 09/275,793, filed on Mar. 25, 1999, now Pat. No. 6,146,148, which is a continuation of application No. PCT/US97/16672, filed on Sep. 24, 1997.

(60) Provisional application No. 60/026,680, filed on Sep. 25, 1996.

(51) Int. Cl.[7] ................................................ G09B 7/00
(52) U.S. Cl. ..................... 434/322; 434/323; 434/350; 434/362
(58) Field of Search .............................. 434/107, 108, 434/109, 219, 235, 236, 237, 322, 323, 335, 362, 350

(56) References Cited

U.S. PATENT DOCUMENTS

| | | | |
|---|---|---|---|
| 4,414,621 A | 11/1983 | Bown et al. | |
| 4,435,772 A | 3/1984 | Suzuki et al. | |
| 4,503,499 A | 3/1985 | Mason et al. | |
| 4,764,120 A | * 8/1988 | Griffin et al. | 434/336 |
| 4,793,813 A | * 12/1988 | Bitzer et al. | 434/335 |
| 4,939,509 A | 7/1990 | Bartholomew et al. | |
| 5,002,491 A | 3/1991 | Abrahamson et al. | |
| 5,107,443 A | 4/1992 | Smith et al. | |
| 5,176,520 A | 1/1993 | Hamilton | |
| 5,206,934 A | 4/1993 | Naef, III | |
| 5,208,912 A | 5/1993 | Nakayama et al. | |
| 5,220,657 A | 6/1993 | Bly et al. | |
| 5,280,583 A | 1/1994 | Nakayama et al. | |
| 5,293,619 A | 3/1994 | Dean | |
| 5,302,132 A | 4/1994 | Corder | |
| 5,303,042 A | 4/1994 | Lewis et al. | |
| 5,306,154 A | 4/1994 | Ujita et al. | |
| 5,311,422 A | 5/1994 | Loftin et al. | |

(List continued on next page.)

FOREIGN PATENT DOCUMENTS

| | | |
|---|---|---|
| EP | 0106213 B1 | 12/1987 |
| EP | 279558 | 7/1993 |
| JP | 327328 | 12/1991 |
| JP | 403273280 A | 12/1991 |
| WO | WO 93/16454 | 8/1993 |
| WO | WO 93/21618 | 10/1993 |

Primary Examiner—John Edmund Rovnak
(74) Attorney, Agent, or Firm—Venable LLP; Robert Babayi

(57) ABSTRACT

This invention is a computer based system for the assessment, management and instruction of students, and for the delivery of work pages and other instructional materials in the form of electronic student workbooks. The computer based assessment of the student produces a student profile including skill gaps or learning objectives. Teacher (20) and student (22) workstations are networked CPUs with pen-based tablet inputs, and displays network with a central processor (10) and data base. A director workstation may also be networked with the central processor. The central processor generates a teacher workbook either directly or with input from the director workstation. The teacher, or teacher and director together, assemble an electronic student workbook containing instructional materials correlated with the student profile. The system tracks useful data such as instructional material (e.g., textbook pages, work sheets, software, simulations, tests, etc.) delivered to students.

11 Claims, 11 Drawing Sheets

U.S. PATENT DOCUMENTS

| | | |
|---|---|---|
| 5,318,450 A | 6/1994 | Carver |
| 5,437,555 A | 8/1995 | Ziv-El |
| 5,441,415 A | 8/1995 | Lee et al. |
| 5,473,367 A | 12/1995 | Bales et al. |
| 5,564,043 A | 10/1996 | Siefert |
| 5,597,312 A | 1/1997 | Bloom et al. |
| 5,699,526 A | 12/1997 | Siefert |
| 5,721,906 A | 2/1998 | Siefert |
| 5,727,950 A * | 3/1998 | Cook et al. .................. 434/350 |
| 5,743,743 A | 4/1998 | Ho et al. |
| 5,810,605 A | 9/1998 | Siefert |
| 5,850,629 A | 12/1998 | Holm et al. |
| 5,862,223 A | 1/1999 | Walker et al. |
| 5,904,485 A * | 5/1999 | Siefert ........................ 434/322 |
| 5,947,747 A * | 9/1999 | Walker et al. .............. 434/354 |
| 6,029,043 A | 2/2000 | Ho et al. |
| 6,064,856 A | 5/2000 | Lee et al. |
| 6,091,930 A * | 7/2000 | Mortimer et al. ............ 434/362 |
| 6,115,712 A * | 9/2000 | Islam et al. .................... 707/10 |
| 6,146,148 A * | 11/2000 | Stuppy ........................ 434/322 |
| 6,177,940 B1 * | 1/2001 | Bond et al. ................. 345/352 |

* cited by examiner

FIG. 10

SYSTEM AND METHOD FOR CONDUCTING A LEARNING SESSION USING TEACHER AND STUDENT WORKBOOKS

This application is a continuation of U.S. application Ser. No. 09/678,030, filed Oct. 3, 2000, now U.S. Pat. No. 6,592,379 which is a continuation of U.S. application Ser. No. 09/275,793, filed Mar. 25, 1999, now U.S. Pat. No. 6,146,148, which is a continuation of PCT/US97/16672, filed Sep. 24, 1997, and claims the benefit of U.S. Provisional Application Serial No. 60/026,680, filed Sep. 25, 1996. The U.S. application Ser. No. 09/275,793 is hereby incorporated in its entirety by reference.

BACKGROUND OF THE INVENTION

It has long been an objective in education to automate the handwritten pen and paper-and-pencil testing process and to develop a computer-based diagnostic and prescriptive student assessment system for use in tutoring and supplemental education franchises, corporate education and school-based learning centers. Educational testing organizations have strived to allow teachers and learning center personnel to administer a complete and accurate student assessment test battery using computers. In addition, once students have been assessed, it would be advantageous to automatically develop individualized student workbooks suited for each particular student, and then automate the assembly and delivery of instructional material required by the individual student.

Currently, when a student enrolls in tutorial or supplemental educational programs, he or she completes a series of primarily paper-and-pencil diagnostic tests to identify subject-specific skill gaps. Once these tests are corrected and analyzed against a given curriculum of subject-specific learning objectives, a teacher or supervisor outlines a personalized program of instruction through which the student will master the subject.

It is an object of the present invention to automate the testing process. It is a further object of the present invention to provide a computer system for administering a complete diagnostic test battery, including, as appropriate, vision and other tests. It is a further object to gather information suitable for assisting in the diagnosis, prescription, and instruction of students, and to maintain appropriate records of the process.

Once a student has completed a test battery, it is an object of the present invention to diagnose and analyze the test results to identify the student's skill gaps and produce a useful student profile. It is a further object of the present invention to generate a personalized study plan and prescription which can then be followed and tracked using an automated delivery system for instructional materials. In short, it is also an object of the present invention to generate more useful diagnostic, prescriptive, instructional and marketing information than the current battery of mostly paper-and-pencil tests presently provide.

It is yet another object of the present invention to develop a new automated assessment system to replace the mostly paper-and-pencil test battery presently administered in tutorial learning centers. Lastly, still further objects of the present invention are to enhance assessment, improve effectiveness, streamline test administration and use, increase profitability of tutorial learning centers utilizing the system of the invention, reduce administration and scoring costs, eliminate duplicate data entry between applications, support new educational product development, improve instruction, upgrade process efficiency, increase student length-of-stay, enhance quality control, and improve data collection.

SUMMARY OF THE INVENTION

In accordance with the above objects, the present invention provides a method of automated delivery of instructional material. The method comprises, in one embodiment, steps (a)–(e). Step (a) is generating student profile data including skill gaps. Step (b) is generating an electronic student workbook containing instructional material correlated to the student profile data. Step (c) is displaying the electronic workbook on a student workstation. Step (d) is collecting student input data input at the student workstation in response to instructional materials. Finally, step (e) is updating the student profile data in response to the student input data.

Preferably, step (b) of generating an electronic student workbook further comprises steps (b1)–(b3). Step (b1) is generating an electronic teacher workbook containing a set of instructional materials correlated to the student profile. Step (b2) is displaying the teacher workbook on a teacher workstation. Lastly, step (b3) is generating the student workbook from a subset of said instructional materials selected by input into the teacher workstation.

In another preferred embodiment, step (e) further comprises the steps of: collecting student input data from the student workstation to the teachers workbook, and collecting teacher input data input into the teacher workstation. The student profile data is then preferably updated in response to student input data and teacher input data.

In another embodiment, the method further comprises the step of collecting instructional material data corresponding to instructional materials sent to a student, and calculating charges based on the instructional material data. Such charges can be either student charges, or charges to the centers using the system for the use of copyrighted or proprietary instructional materials.

Step (a) of generating student profile data comprises administering a test to the student for identifying a discrete set of skill gaps, wherein the profile comprises the discrete set of skill gaps.

Step (e) of updating the student profile data, preferably comprises adding and subtracting skill gaps.

The method of the invention is preferably carried out so that the step (e) of updating the student profile data is followed by steps (b), (c), (d) and (e) to form a feedback loop containing steps (b), (c), (d) and (e).

The teacher workbook preferably has an application for taking notes, and an application for generating statistics in response to the student input data.

In a still further embodiment, step (b1) of generating an electronic teacher workbook further includes the additional steps of (b11), (b12), and (b13). Step (b11) is generating an electronic director workbook containing a set of instructional materials correlated to the student profile. Step (b12) is displaying the director workbook on a director workstation, and step (b13) is generating the teacher workbook from a subset of said instructional materials selected by input into the director workstation. In this embodiment, step (e) preferably further includes the steps of: collecting student input data from the student workbook to the teachers workbook, collecting teacher input data input into the teacher workstation, and collecting director input data into the director workstation. The student profile data is then updated in response to student input data, teacher input data, and director input data.

Also in accordance with the present invention, the present invention provides a system for electronic instructional delivery. The system has a central data base containing student profile data and instructional materials. A central processor is connected to the central database for generating electronic teacher workbooks from the student profile data and instructional materials. A teacher workstation is connected to the central processor. The teacher workstation includes a display for displaying teacher workbooks generated by the central processor, an input device for inputing teacher input data generated in response to the teacher workbooks, and a processor for generating electronic student workbooks comprising instructional materials in response to the teacher input and student profile data. A student workstation is connected to the teacher workstation. The student workstation includes a display for displaying student workbooks, an input device for inputing student input data generated in response to instructional materials in the student workbook, and means for forwarding input data to the central processor to update the student profile data. In this preferred embodiment of the system, the student profile data preferably comprises skill gaps.

Another embodiment of the system according to the present invention has a director workstation connected to the central processor. The director workstation, includes a display for displaying director workbooks generated by the central processor, an input device for inputing director input data generated in response to the director workbooks, and a processor for generating electronic teacher workbooks comprising instructional materials in response to the director input and the student profile data.

In a yet further embodiment of the system of the present invention, the director, teacher and student workstations are merely displays and input devices and all processing is done by the central processor.

The system of the present invention preferably has a single teacher workstation and a plurality of student workstations at a single location on a U-shaped table.

Further objects, features and advantages of the present invention will become apparent from the Description of the Preferred Embodiments which follows, when considered together with the attached Drawings.

DESCRIPTION OF THE DRAWINGS

FIG. 10 another page of the Basic Facts section of the electronic teacher workbook.

DESCRIPTION OF THE PREFERRED EMBODIMENTS

Figure 1:
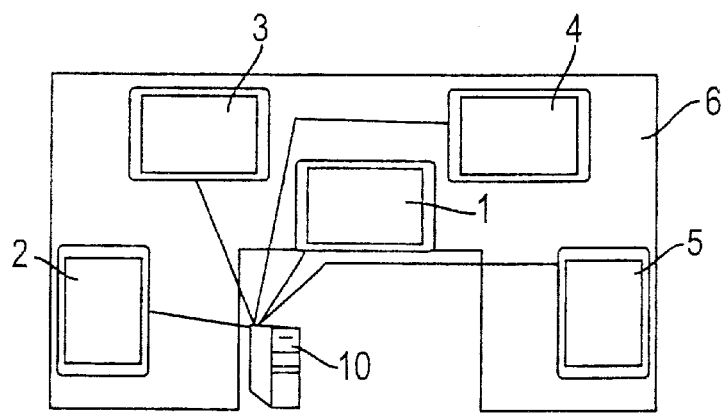
FIG. 1 is a schematic representation of a system according to the present invention.

The invention is directed to a computer based system for the assessment, management and instruction of students and for the delivery of work pages and other instructional materials in the form of electronic student workbooks. In a preferred embodiment, as shown schematically in FIG. 1, the system is designed for use with a table 6 that seats a teacher and a number of students. The teacher has a teacher workstation 1, and the four students have student workstations 2–5. In this embodiment, the teacher workstation 1 and the student workstations 2–5 are networked CPUs with a pen-based tablet input and display. The teacher can send selected instructional materials to each of the students through the pen tablet interface of workstation 1 and can see what each student is doing on that student's pen tablet interface upon receipt of the image on the display of teacher workstation 1. Although FIG. 1 shows a worktable 6 in which the teacher and students are at the same location, because the system comprises networked CPUs, through such methods as LAN, WAN, Dial-up, or other methods, it is possible to have additional students, or even all students at remote locations.

As will be explained in detail below, with reference to the Figures and to the Examples, the delivery of student workbooks is accomplished in accordance with a previously, preferably automatically, assessed student profile of each student. The system of this embodiment may also accomplish the assessment and diagnosis to generate a student profile. The profile is then used by the system to generate electronic student workbooks personalized for each student.

In the automated assessment and diagnostic testing, a student receives instructions directly from a computer through a multimedia interface, in this embodiment, the pen based workstation 2–5 and an audio headset (not shown) connected to each workstation for delivering oral instructions to the student. The student takes the assessment test and answers electronically using the pen or other input device. The answers are scored electronically so that the student's initial assessment is free of scoring and administration errors. The student may also receive a battery of tests over one of the workstations 2–5. The tests are generally designed to identify the ability to perform different tasks or the mastery of certain learning objectives or skills. The assessment tests are scored and analyzed by computer to generate a student profile which is then utilized by the system of the present invention to generate a learning program suited to that student and deliver electronic student workbooks to the workstations 2–5 of the system of the present invention. The student profile contains, among other data, skill gaps which need to be filled by further instruction. Ongoing assessments during the use of the system are used to expand and update the profile.

The system architecture incorporates a file server 10 networked to and capable of receiving input from multiple student workstations and multiple teacher workstations.

Figure 2A:
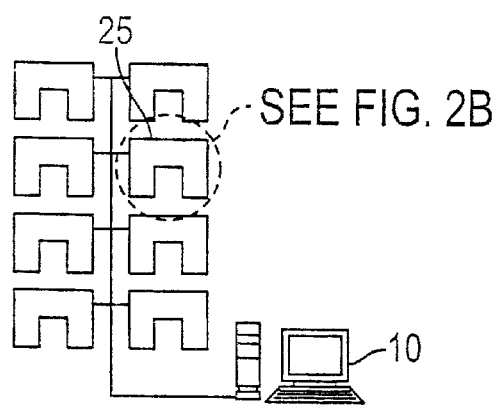
FIG. 2 is a schematic representation of another embodiment of the system according to the invention including a plurality of worktables.
Figure 2B:
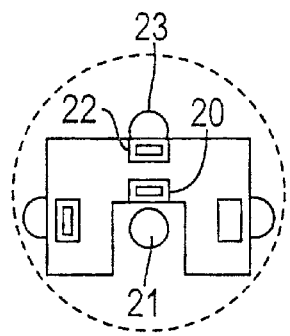

FIG. 2 shows another embodiment of the present invention comprising a server 10 and multiple worktables 25. Each worktable 25 has a teacher workstation 20 where a teacher 21 can be seated and a plurality of student workstations 22 where students 24 are seated. FIG. 2 shows three student workstations 22, but any number of student workstations is possible depending on the desired student/teacher ratio. Each teacher workstation 20 and student workstation 22 is provided with a networkable microprocessor. An individual teacher 21 may communicate through the network to any of the student workstations 22. Likewise, other teachers may engage a plurality of different students at another worktable 25 in a similar or different arrangement. In FIG. 2, the worktables 25 are shown in the shape of a "U" with the teacher 21 and teacher workstation 20 in the middle surrounded by students 23 and student workstations 22. The invention is just as applicable to round-tables or other suitable configurations. In other embodiments, the teacher and student may be at completely different locations.

The server 10 is adapted to track the various activities and inputs of each student and record student input data, either automatically through the student workstation 22, or manually as a result of teacher inputs from teacher workstation 20.

The system is designed to preserve student-teacher interaction, because the pen tablet interface is on the surface of table 25 and is not a vertical display interfering with eye contact. Other embodiments are contemplated which further provide mechanisms by which the angle of the screen may be adjusted, or other input devices such as keyboards to supplement the pen input.

The teacher 21 sits at table 25 and each student 23 sits at the table 25 at a location opposite or adjacent the teacher 21. Each teacher workstation 20 and each student workstation 23 comprises a fully functional microcomputer or computer controlled display device. In the preferred embodiment, for example, each workstation 20,23 is a personal computer capable of running any one of a plurality of programs, either supplied by the network provider or over central server 10, or run from a hard disk, RAM or other storage device on the workstation 20, 22 itself. In other words, for example, the system software and applications software are preferably fully compatible with commercially available computer systems, such as, for example Pentium™ based personal computer systems, to allow third party commercial educational software to be easily integrated over the network. Of course, the invention is not limited to any one kind of processor type, and other computer systems and processors may be employed.

In another embodiment, the teacher and student workstations 20, 22 ate merely displays and inputs, and all calculation takes place in the central processor 10.

The overall system according to the invention contemplates a seamless arrangement whereby a student enters the teaching environment represented in FIG. 2 by worktable 25 and receives a battery of assessment tests, which in a preferred system would be an automated battery of tests for assessment and diagnostics in order to produce the student profile. A student initially receives a test to determine his or her level of mastery for every skill or learning objective to identify skill gap data. The skill gap data then becomes part of the student profile.

A locator test can first be given to pinpoint the most appropriate testing level for the student, and allow more accurate assessment and the generation of a more accurate student profile. The locator test is preferably reading and math oriented and is designed to allow subsequent testing to be done at the level appropriate for the student's skill. With very young children, for example, who may not be able to read, non-verbal testing may be required. With older children, mathematical testing, for example, may have to be done at a lower reading level in order to properly assess the child's ability without a bias associated with a lower reading level, and to thus generate an accurate and useful student profile.

The assessment and diagnostic testing required to generate the student profile is preferably automated in order to avoid manual testing errors that can have significant effect on the assessment of the student's progress. Such automated testing can be executed at the student workstation 23 using the pen tablet interface of the preferred embodiment, or another appropriate interface. It is also possible for assessment and diagnostic testing to take place remotely from worktable 25.

Once the battery of tests is completed, the system corrects the tests and provides a student profile of the student's ability level. The profile is then preferably evaluated by a director of education (DE), some other manager, or a teacher. Notes and comments can be entered in the teacher workbook generated using the student profile data. Such additions to the teacher workbook will assist when the teacher workbook is used to generate a student workbook or deliver instructional materials at a later time in the teaching process. The teacher or DE may plan or pick instructional materials which become part of the students workbook based on selections created by the server in accordance with the student profile. Of course, the student workbook can also be generated automatically without teacher assistance using the data of the student profile. The student workbook including these selected materials is then stored in the memory of the server.

Server 10 or the teacher workstation 20 can track the instructional materials delivered to the student workstation for charge calculation purposes. As used herein, the term instructional material refers to data or software useful in instruction, and includes, for example, textbook pages, work sheets, instructional software, simulations and tests of various kinds.

When instructing students, the teacher 21 instructs one or more students 24 at worktable 25. Each student has a student workstation 23, comprising a pen tablet interface in the preferred embodiment. The pen tablet or student workstation 23 is placed on the surface of table 25, as is the teacher workstation 21. This construction, as mentioned above, facilitates student/teacher interaction.

The preferred embodiment of the instructional delivery and student management process will be explained in the Example with reference to FIGS. 3–10.

FIGS. 4–10 illustrate sample computer screens of the teacher workbook and student workbooks according to the present invention and illustrate how the two are interconnected and used with teacher workstations 20 and student workstations 22. The sample screens of the Figs. illustrate various features of the invention including the interactive technique for delivering instructional materials to the students.

In the preferred embodiment, the student and teacher workbooks create a workbook metaphor user environment. What the user sees is a representation of a ring binder. Touching tabs on either side of the workbook allows the user to switch between sections, and touching the lower corners of individual pages allows the user to turn pages within the workbook.

However, the terms teacher student and director workbooks are not limited to a notebook metaphor user environment, but include other graphical interface user environments as well. It may be appropriate to have a classroom user environment or school house user environment. It may even be appropriate to tailor the user environment to the grade level or subject taught. In short, as used herein, workbook refers broadly to the combination of software graphical interface and data contained displayed thereby.

Figure 6:
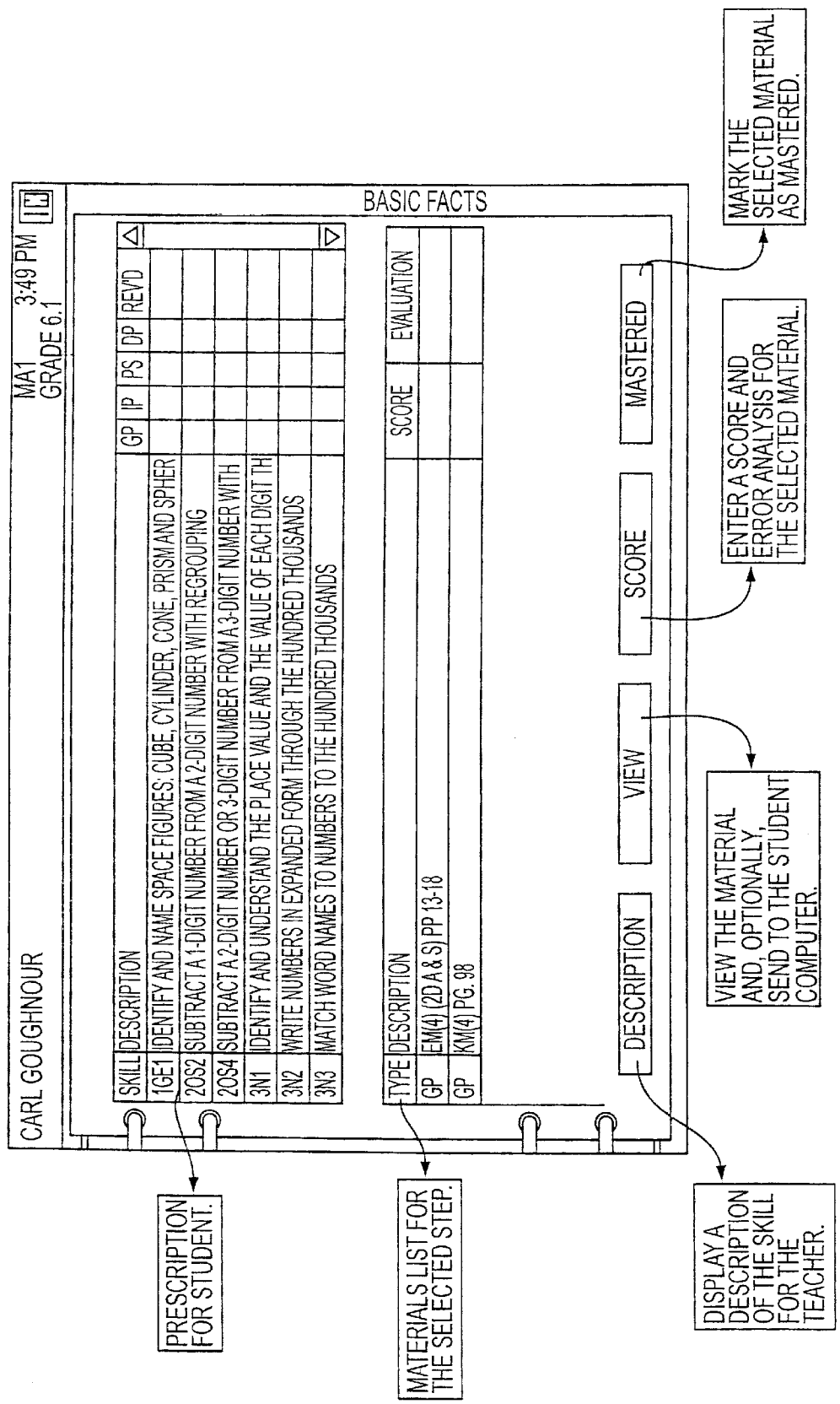
FIG. 6 is an instruction section from the electronic teacher workbook according to the present invention.
Figure 7:
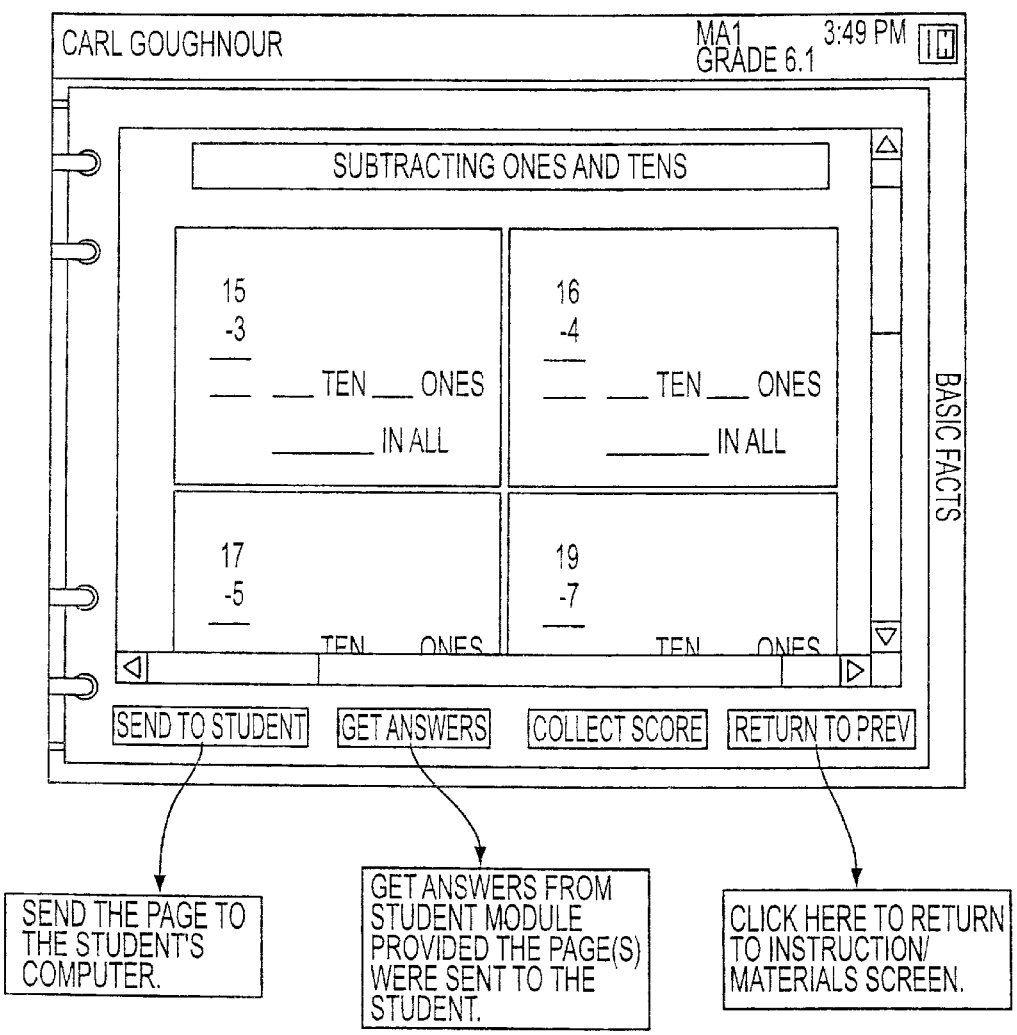
FIG. 7 is a screen display or page from the teacher workbook according to the invention showing an example of instructional material to be sent to a student after selection from the instruction section.
Figure 8:
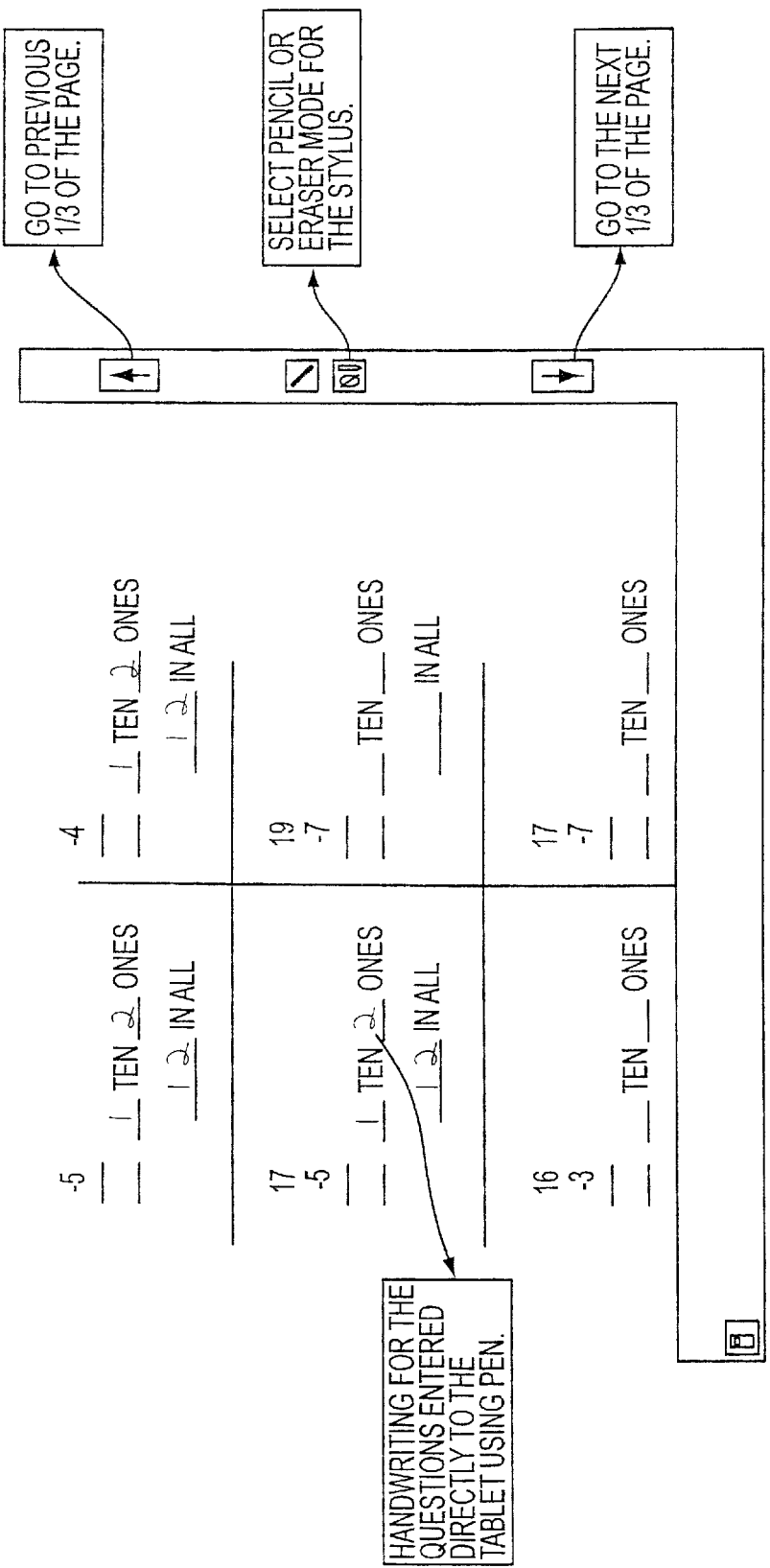
FIG. 8 shows a page of the electronic student workbook displaying the instructional material of FIG. 7.

FIG. 8, for example, illustrates the capture of handwriting input by the pen tablet of the student workstation 22 during manual exercises in the student workbook. The teacher workbook itself is illustrated in FIGS. 4–7, 9 and 10. A page of instruction section of the teacher workbook showing skill activities assembled in accordance with a given student profile is illustrated in FIG. 6. As will be explained in detail in the example below, using the pen, mouse, or other pointing device, various boxes may be clicked to call up information on assembled instructional materials in the lower half of the screen relating to a particular skill gap identified in the student profile of a particular student.

Figure 9:
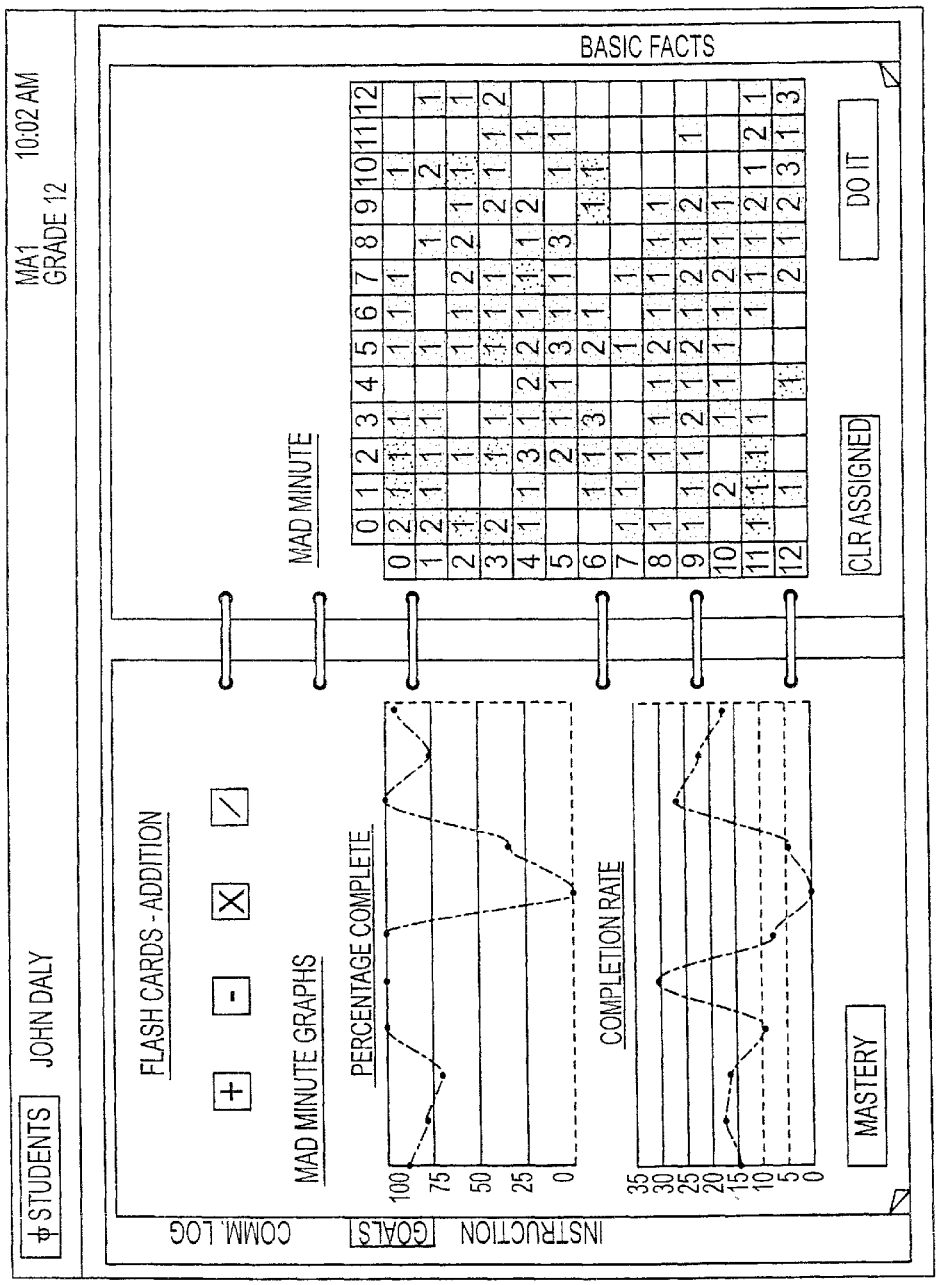
FIG. 9 shows the Basic Facts section of the electronic teacher workbook according to the preferred embodiment of the invention.
Figure 10:
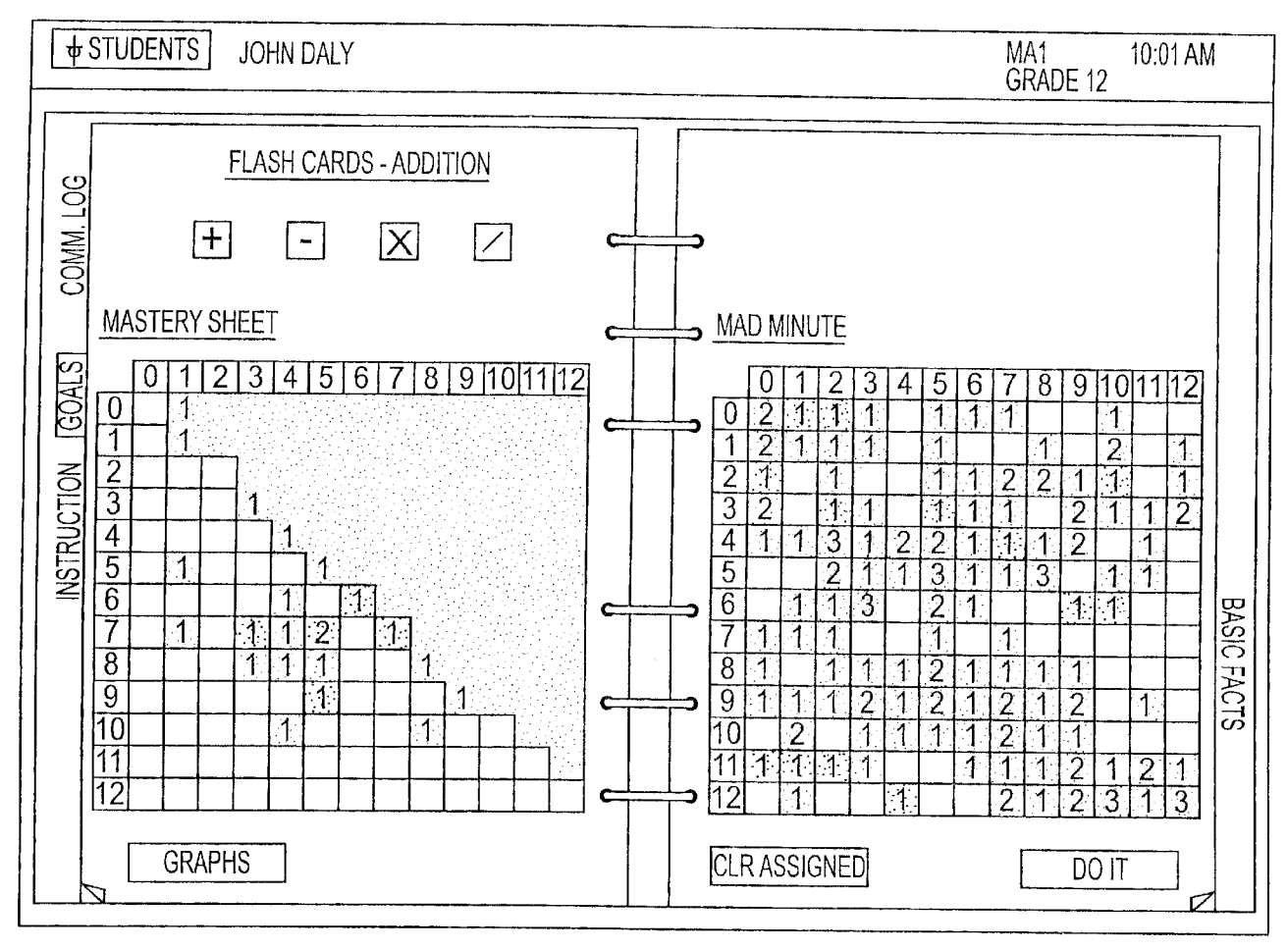

The FIGS. 9 and 10 illustrate interactive teaching and record keeping associated with an exemplary automated exercise designed to teach basic math facts. The use of the notebook pages associated with this exercise is explained in detail below in the Example.

In general, the teacher may select an exercise from among the instructional materials assembled in accordance with the student profile and do exercises or review the materials along with the student, referred to as guided practice (GP). After the guided practice, the teacher may assign other materials for independent practice (IP) by calling up an exercise in the teacher workbook and then forwarding the exercise or material to the student workbook where it appears on the student's screen for the student to do unassisted.

Depending upon the results of the IP, the teacher may then assign a problem solving (PS) session to the student workbook. Problem solving is a higher level of exercise in which the student, for example, practices a mathematical concept using word problems. Thereafter, a so-called distributed practice (DP) or mastery test is administered to determine whether the student has mastered the material or a particular skill. The DP is preferably administered during a later session in order to test whether the material has been retained. The results from the DP or mastery test are then stored in the server and used to update or amend the student profile.

At each stage of instruction and practice, records pertaining to the student may be entered in the teacher's electronic workbook. The student workbook, as discussed above, and as will be better understood later, is the combination of a software module and data base for displaying and accessing instructional materials in accordance with the student profile and teacher commands and storing response and other input data from the student. Likewise, the teacher workbook is a combination of software module and database containing and displaying an assembly of instructional materials generated in accordance with the student profile. In the preferred embodiment, the teacher uses the teacher workbook to instruct the student and assemble the student workbook. However, the student workbook can also be generated by a director of education (DE) or automatically by the central processor in accordance with the student profile. The student workbook is used to deliver instructional materials to the student and retrieve input data and forwards the data to the teacher workbook or central processor.

In accordance with the invention, the workbook format or metaphor allows the teacher to look at the materials assigned to the student and the progress the student has made. The materials assigned in the student workbook are delivered in accordance with the student profile, as discussed above, either (1) as assigned by the DE, (2) as assigned by the teacher by means of the teacher workbook or (3) as automatically assembled by the central processor in accordance with the student profile.

When the various stages of practice have been completed, the workbook may be marked and any inputs automatically stored. Grades, error analysis, and time on task records may be automatically logged for later analysis and used in the updating or amendment of the student profile. Some records for use in amending the student profile may also be entered manually by the teacher from the teacher workbook. The teacher uses the notebook metaphor electronic teacher workbook to tab through the teacher workbook to various sections, for example, instruction, goals, etc., wherein activities may be logged and notes taken. As discussed in detail in the Example, by clicking a mouse or touching the pen to the screen at the tab, a particular page or section of the teacher notebook opens.

In order to determine whether the system of the present invention is working properly, accurate records are necessary. To this end, the system allows for automated record keeping, storage and analysis. The records are kept for the benefit of the student, and for allowing the teacher to conduct meaningful comprehensive parent teacher conferences. Parent teacher conference can be conducted with the same interactive arrangement of the worktable 25 and workstations 20, 23 shown in FIG. 2.

Records may also be kept on a global basis in order to evaluate the system effectiveness for a large number of students. Statistical information and analysis may be kept, which is useful in evaluating specific instructional materials assembled in the workbooks and the relationship of the instructional materials used to the skill level of the student. It is important to identify which instructional materials or methods work for teaching a particular concept to students of a particular skill level, in a particular age group, or with certain demographic or other characteristics. The feedback mechanism of the system of the present invention allows for constant improvement of the entire system. Instructional materials can be analyzed for effectiveness at the same time that students progress is noted and student profiles continually updated and amended. Feedback is also used on a one-to-one basis between the teacher and the student.

The pen-based computer tablet interface arrangement of workstations 20,23 allows for free style writing on the tablet. During an instructional session, the teacher can call the teacher workbook for each student 23, and with it instructional materials for various practice exercises over the entire range from GP to DP. For example, as shown in FIGS. 7 and 8, the teacher may call up a page of subtraction problems and transfer the problems to student workbook which is viewed at the student workstation 22. The student may then answer the problems by physically entering the answer on the problem solving screen of the appropriate workbook page. For example, the student may simply write in by hand the sum of a column of numbers below the column as in a traditional written mathematics exercise. In the meantime, the teacher 21 may be working with another student by turning to the section of the teacher workbook devoted to that student and supplying different instructional materials or other activities and at a grade or learning levels appropriate to the second student as determined by that student's profile. When it is time to review an exercise, the teacher can call the work sheet from the student workbook to the teacher workstation 20 where it may be evaluated. Both student and teacher may look at the results. In this connection, the teacher sees exactly what was presented to the student and the actual written responses of the student. The teacher may call up the correct answer for comparison with the student's answer and if the answer is incorrect, discuss the reason for the error. The teacher may then use the knowledge gained from this interactive error analysis to explain the work, to assign another exercise, such as those from among a set assembled in accordance with the student profile, or to amend the student profile.

A number of alternate arrangements of assessment and diagnostic tests for generating a student profile are contemplated. A first arrangement employs a scannable score sheet for machine scoring. The scannable score sheet is scanned by an image scanner. The scannable score sheet is typically a "bubble sheet" for entry of answers. This technique uses an answer sheet which is keyed to an associated instruction booklet.

An alternative arrangement of the assessment and diagnostic test is a computer test arrangement in which the computer screen is used to display test questions and the answers may be entered on the screen using the electronic pen or other input device. Either in the embodiment using scannable sheet or the computer test, scores are computed automatically upon entry into the computer, and a student profile generated from the results. With very young children, for example, responses to questions, or whether questions were answered correctly or incorrectly could be manually input by a teacher or proctor.

The computer test arrangement is especially useful with children, as smudging errors and the like experienced with scannable sheet test are reduced. Also, the computer test may be used with a multimedia arrangement contemplated by the invention in which the student uses the student workstation 23 and auxiliary headphones to hear questions and/or answers appearing on the screen. The advantage of both types of tests, is that automated scoring and reporting may be achieved with great time savings. Also, when used in combination with recorded instructions, great consistency in test administration is achieved. It is contemplated that instructions for either the scannable sheet or computer tests would be recorded professionally with appropriate scripting and voice inflection to stimulate a test taker's interest and enthusiasm. Also, a recorded script properly delivered to every applicant results in more consistent results, and easier evaluation of the test itself. Lastly, the instructions could be delivered in any of several languages, depending on the test give.

Other advantages of the automated system according to the present invention include reducing paperwork and greatly increasing efficiency. For example, currently, individual student results are forwarded to a central location for statistical tracking and the like. The method and system of the invention allows for electronic bundling and transmission of data for batch processing of results thereby reducing paperwork and data entry problems, saving time and improving efficiency results from other automated tasks.

Additional advantages of the system allow for the incorporation of many currently available multimedia programs in the set of instructional materials assembled in accordance with a given student profile. This method improves resource availability and system versatility.

Also, independent tests may be incorporated into the method and system according to the present invention. Examples of independent tests are vision screening and receptive vocabulary tests, which can be supplied by outside vendors as off the shelf software. The results of these tests may or may not be used in the generation, updating and amendment of the student profile. Also, students tend to operate at a computer workstation for longer periods and with more enthusiasm than they might otherwise using conventional materials, thereby increasing length of stay, or time that students are enrolled in learning centers using the system of the invention.

EXAMPLE

This example illustrates the preferred embodiments of the present invention, but the invention is not intended to be limited thereto.

The automated assessment and diagnostic/prescriptive test to identify skill gaps and generate the student profile, and thereafter the automated instructional delivery is, for example, carried out with the following computer hardware.
Hardware:
    a plurality of IBM-compatible or Mac computers
    networked operating system for file access/sharing
    color VGA display (CRT-monitor or LCD-flat panel color display)
    pointing/input device:
        can be light pen hooked up to bus or serial port
        mouse (e.g., PS/2), or
        pen-based stylus (e.g., electro magnetic or electrostatic)
        touch-screen display (e.g., resistive technology)
        keyboard (infrared or cabled)
        multimedia hardware including CD-ROM, sound card, etc.

The hardware above is assembled into a network of worktables 25 as shown in FIG. 2.

Software is provided to administer and score a battery of diagnostic/prescriptive assessments. Multimedia and graphics software are provided for student prompting and answer selection. Sound software is provided for test administration instructions and feedback. In addition, answer evaluation and test scoring and result analysis software is also provided.

In this Example, the computer administers a battery of diagnostic and prescriptive tests to a student. The computer then scores the student's answers and computes scale scores, percentiles, and grade equivalent scores. An item analysis is performed to identify skill gaps which are used to generate a student profile. Software is provided to track and manage student results. The tests are then scored and test norm comparisons are made. Lastly, student profiles are created from the test results.

Prescriptions, that is, assemblies or lists of instructional or other materials are made in accordance with the student profile. Software is provided to update and amend student profiles, using, for example pre- and post test comparisons.

At the stage of automatic instruction, software tracks student progress in the mastery of certain skills and material. In other words, the software determines whether the "skill gaps" recorded in the student profile have been filled. The software provides for the storage, retrieval and delivery of instructional materials, and input in response to the instructional material. In accordance with the input with respect to the instructional material, the software updates or amends the student profile and thus allows the assembly of new sets of instructional material and further automated instruction.

The automated delivery of instructional materials is conducted as follows. The teacher refers to a teacher workbook generated in accordance with the student profile and identifies a skill to cover. The teacher workbook displayed on the teacher workstation shows instructional materials correlated for the identified skill area in accordance with the student profile. The teacher selects an instructional item, and, at the teacher's command, the item is sent to the student workbook and displayed on the student workstation. The student uses stylus, light pen, mouse, touch-screen, or keyboard to solve problems, and input answers in a fashion appropriate to the configuration of the system. In the embodiment of this example, the pen is used to write or select answers. Thus the teacher can monitor as students work. The student management/tracking system of the teacher workbooks records the student's performance. In this way, the system can track student progress based on instructional materials, skill gaps, teacher, time spent on different skills, etc. By periodically updating the student profile, a new prescription for the student is produced and the automated delivery process repeated.

Software Module Names and Definitions

The system according to the present invention preferably comprises the following software modules.

Document Manager Module

The Document Manager is used to insert teaching or instructional material into the database. Documents added can have question input areas assigned.

The Document Manager preferably has the following features:
 (1) Scans in images from a TWAIN compatible or other device.
 (2) Reads text data from the existing sources in the student profile database (Ma1Pages.TXT).
 (3) Stores data in a compact format
 (4) Supports Bitmap, Envoy, ASCII Text, Rich Text Format, or other convenient formats.

DE/Administrator Module

The DE/Administrator module allows the DE of the center to administer the system, preferably has the following features:
 (1) User Group and User ID setup. All passwords and security clearances are defined through this module. All access to the system is via a User ID/Password that controls features accessible to that user. Each user is assigned to a group. Each group is assigned combinations of accessible features. Groups are defined on a center by center basis allowing ultimate control of data by the directors.
 (2) Review of Communication Logs. The DE can list and review all communication logs entered by the teachers.
 (3) Assign teaching steps for the teachers. If desired, the DE can review all information about a student and assign the instructional materials for GP, IP, PS and DP's to be used with the student. Yet it may be preferable in some instances to have teachers assign work, or to have work assigned automatically by the system in accordance with the student profiles. Therefore, this feature is optional.
 (4) Enter special notes for the teacher. These notes will be displayed in the teacher's workbook when the student is taught again. Notes can be made mandatory so a teacher must acknowledge to the system that a special note was read before continuing with the instruction.
 (5) Perform quality review of data stored by the Teacher module. All data should be presented to the DE in a chronological and logical format. This includes communication log's, test results, special notes, etc.

Teacher Module

The Teacher Module is used by the teacher to administer and deliver the educational materials. This module generates the teacher workbook screens, as illustrated in FIGS. 3–10.

Figure 3:
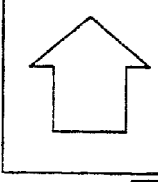
FIG. 3 is a log on screen according to the invention.

The Teacher Module preferably has the following features:

The teacher would log in to the system at the start of the session. This establishes the rights and privileges of the teacher. A typical login screen for use with the present invention is shown in FIG. 3. The login screen allows the teacher to select and seat certain students around the worktable, in the present example, a three student arrangement is shown as seen in FIG. 2.

The teacher enters the student's name at the login screen shown in FIG. 3. In FIG. 3, the teacher has touched the name Carl Goughnour with her pen, and then touched the large arrow at the left of the screen to indicate that student Carl is sitting at the student workstation 22 to her left. From that point in time, the teacher may select other students to sit at the remaining two workstations.

Clicking or touching the "To Instruction" button on the right of the screen after entry of one or more the student's names and ID brings up the electronic teacher workbook for the students which contains the student records, prescription of instructional materials, and other data.

Figure 4:
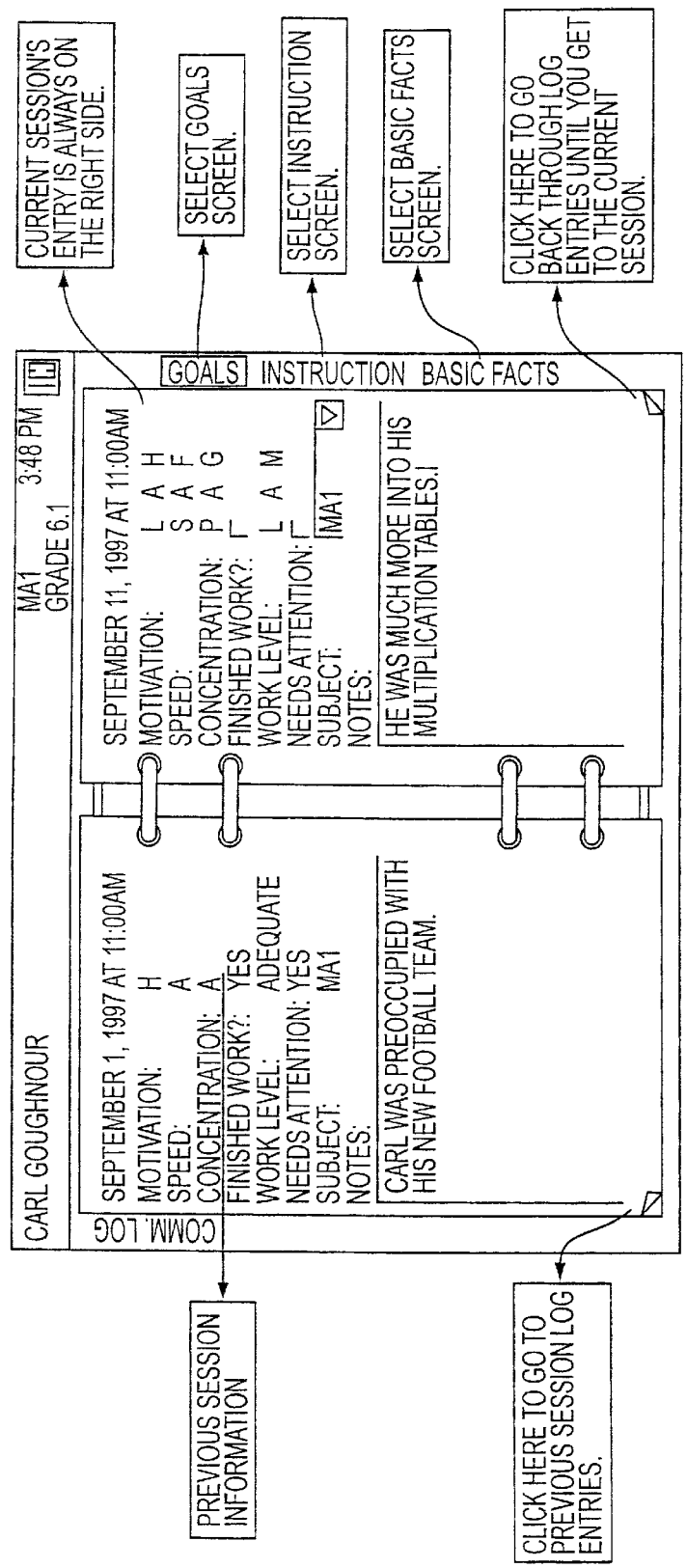
FIG. 4 is a communications log section of the electronic teacher workbook according to the invention.

After log in, the teacher sees a communication log screen, as shown in FIG. 4. The top portion of the screen, approximately top 5%, is a status section. This section displays the current student (Carl Goughnour), grade level (Grade 6.1), program (MA1), hour of instruction, date and time (Sep. 11, 1997 at 11:00am).

The "Students" button placed on the left side of the status section in FIG. 3 drops down a menu with the following options:
 (1) Cancel—Cancel the menu.
 (2) 'Student Names'—Switch to the specified student's workbook.
 (3) Return to Student Placement—Return to the seating screen (See FIG. 8).

The remaining portion of the screen of FIG. 4 follows the workbook metaphor and displays a section of the electronic teacher workbook. Tabs are used on the left and right side of a given section to switch between various teacher workbook sections. FIG. 4 shows tabs for Communication Log, Goals, Instruction, and Basic Facts sections. Graphics on the screen are used to reproduce a notebook metaphor (Binder rings, tabs, colors.) Entries on the right hand page of the notebook reflect the current session. Previous session information is given on the left hand page. The teacher can switch between pages by touching or clicking the lower left and right hand corners of the notebook respectively.

The communication log section shown in FIG. 4 is used by the teacher to communicate with the DE, and provides a simplified method for communicating a given instructional session's results.

As show in FIG. 3, the teacher notebook allows the following data fields:
 (1) Motivation: Evaluated at from 1 (low) to 5 (high). The teacher selects a value via a drop-down list.
 (2) Speed: Evaluated at from 1 (low) to 5 (high). The teacher selects a value via a drop-down list.
 (3) Concentration: Evaluated at from 1 (low) to 5 (high). The teacher selects a value via a drop-down list.

(4) Finished Work?: Yes or No. The teacher selects a response via a checkbox.

(5) Work Load: The selections are "Need's More", "Need's Less" or "No Change". The teacher selects via a drop-down list.

(6) Needs Attention: True or False. The teacher selects input via a checkbox. A check in this box is used to notify the DE.

(7) Subject Worked On: The teacher selects either a main subject (in this case MA1) or homework support. This selection is used to assign and increment the hours completed. It is preferable that homework support hours do not count towards the completion of an original subject. This field defaults to the original subject so the majority of the time no change will be needed.

(8) Notes: This section allows Free-form text entry and is used for Teacher/DE communications.

Figure 5:
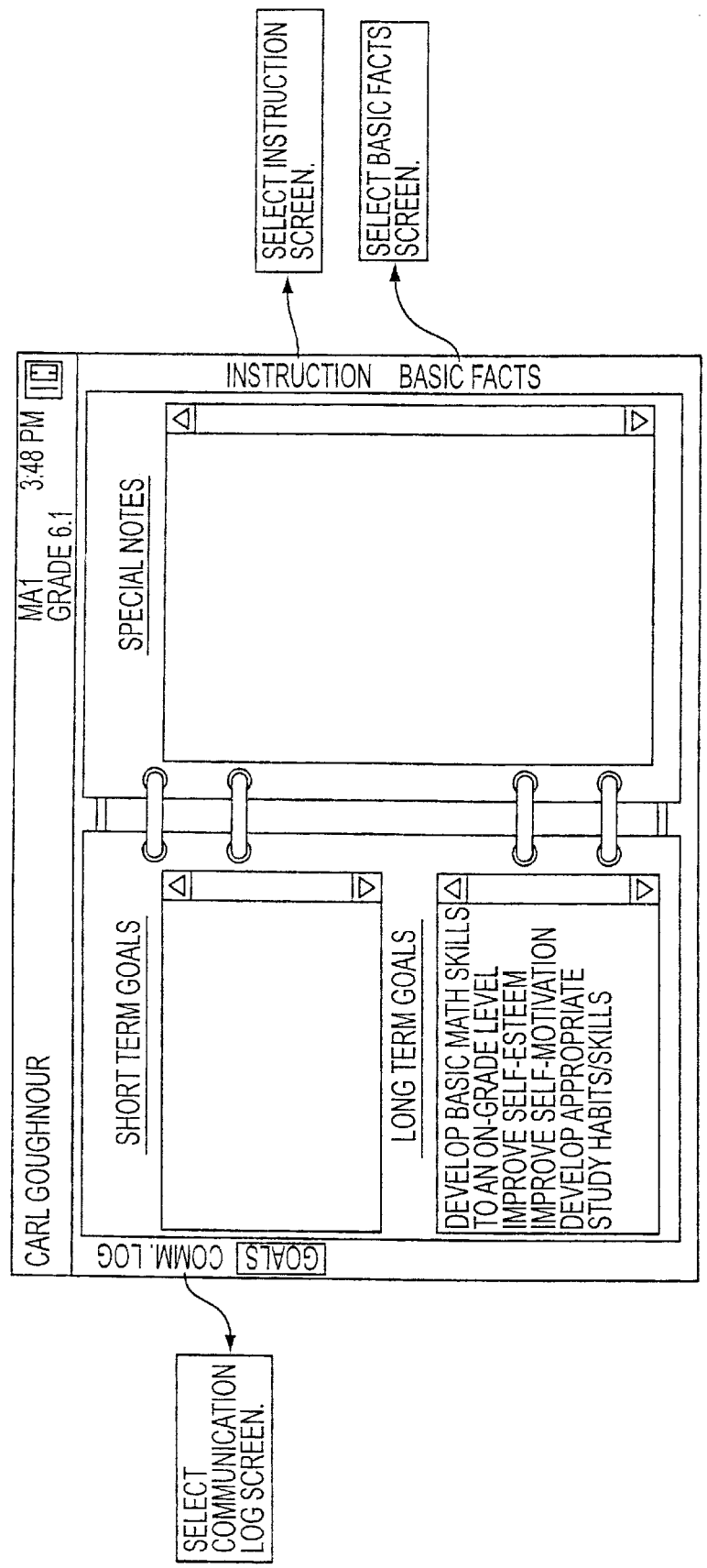
FIG. 5 is a goals section of the electronic teacher workbook according to the present invention.

By clicking on the "Goals" tab of the teacher workbook shown in FIG. 4, the Goals and Special Notes section of the teacher workbook shown in FIG. 5 appears. The pages shown in FIG. 5 are used to display the long-term and short-term goals generated automatically from the student profile or entered with respect to special notes from the DE to the teacher. The left and right hand notebook pages of FIG. 4 shows the goals, and special notes, respectively.

In this embodiment, the Teacher must acknowledge special notes before proceeding to the instruction pages. A button in the lower right side of the special notes page (not shown) will be touched with the stylus to acknowledge the notes.

The instruction of a student using the method and system of the present invention will be described with reference to FIGS. 6–10.

The instruction section of the teacher's workbook shown in FIG. 6 is used to list the skills for the student's prescription, as determined by the student profile. In a grid-like configuration, the skill code, skill description and the steps for teaching process (GP, IP, PS, DP, Review) are listed in the order in which they should be taught. A second grid below the main skills grid displays the instructional materials assembled by the system for the selected skill/step. FIG. 6 shows that a skill designated 2OS2 has been selected for general practice (GP).

The 'View' button at the bottom of the screen in FIG. 6 allows the teacher to view the selected material before sending it to the student's workstation and notebook. After pressing "View", a screen such as that shown in FIG. 7 appears. In the screen of FIG. 7, the teacher has the option of sending the materials to the student workbook by pressing "Send to Student", getting answers from the student by pressing "Get Answers", collecting input from answered questions by pressing "Collect Score", and returning to the instruction screen by pressing "Return to Presc."

The "Description" button at the bottom of the page of FIG. 6 retrieves a description of a particular skill for the teacher. The "Score" button enters a score and error analysis for the particular instructional material and the "Mastered" button.

From the screen of the teacher workbook shown in FIG. 6, the teacher can send questions to the student, and thereafter, retrieve answers for discussion with the student.

FIGS. 9 and 10 illustrate the Basic Facts application for mastering addition, subtraction, multiplication and division tables. The application can randomly generate as many basic math facts questions as a student can answer in one minute. For example in FIG. 9, the teacher will select addition, subtraction, multiplication or division problems, by touching the appropriate symbol on the left hand page of the note book. In FIG. 9, addition has been selected. The teacher may also assign particular addition problems, by touching the appropriate square on the right hand page in FIG. 9. For example, if the square at the intersection of 0 and 1 is selected, the student is given the problem "0+1=?". Any number of problems can be assigned, but if none are assigned, then the program will assign problems randomly. The "Clr Assigned" button at the bottom left of the right hand page of FIG. 9 clears assigned problems: The "Do it" button at the lower right of the right hand page sends the randomly generated or assigned problems to the student workbook. The darkly shaded squares in FIG. 9 indicate the number of times a student has answered a given question incorrectly. For example, the Fig. Shows that this student has answered the question "11+0=?" incorrectly five times. The lightly shaded squares indicate the number of correct answers. Thus, this student has answered "0+0=?" correctly twice. Blank square indicate questions not yet asked.

The graphical information on the left hand page of FIG. 9 shows the percentage of questions the student has completed in the "Mad Minute" exercise, and the completion rate, or number of questions completed in the minute, respectively.

Touching the "Master" button at the bottom of the left hand page in FIG. 9 moves the workbook to the page shown in FIG. 10. The so-called "Mastery Sheet" shown on the left hand page of FIG. 10 simply depicts the right and wrong answers from manually selected questions (not randomly assigned by the computer).

Student Module

The Student Module generates the student workbook and allows the student to receive the educational material sent by the teacher and enter answers via the student workstation. In the preferred embodiment, the workstation is a pen-based computer.

The student module is the interface to the student. It takes most of its direction from the teacher module and workbook. The pen-based technology of the student workstation allows the student module software to be run without a keyboard or mouse. The software therefore needs support for a pen-based interface only. The student module requires, of course, the display of information including the student workbook as required by the teacher module. The student module software allows handwriting to be captured from the student as the student writes and sends this writing or other input to the teacher module for review. The student module should have the capability of running external software applications, when directed by the teacher module. The teacher module should have the ability to stop any external program.

As shown in FIG. 8, up and down arrow buttons scroll the page in thirds. In this embodiment, it takes 3 presses of the down arrow button to go to the next page. Scrolling the page in thirds gives the program a good probability of placing an entire question on the computer's screen. The student can select write or erase modes for the stylus by touching the appropriate button on the left hand of the screen.

Database Structures

The following databases are used as part of the system and method of the present invention.

TABLE 1

T2KItem.DB - Paradox Table.

| Name | Type | Description |
|---|---|---|
| Code | Char(10) | Code for Item |
| Type | Numeric(3) | Item Type: 0 = Page, 1 = Program |
| Price | Numeric(10,4) | Price per Unit |
| UnitType | Numeric(3) | Type of Unit's: 0 = Per Item, 1 = Timed |
| UnitTime | Numeric(4) | If UnitType = 1, the Number of minutes per unit |
| Desc | Char(100) | Description of Item |

Table 1 holds the list of available items used to teach skills, the price per unit and the type of units.

Indices

| Name | Fields/Filter | Description |
|---|---|---|
| Code | Code | |

TABLE 2

Skills.DBF - FoxPro table.

| Name | Type | Description |
|---|---|---|
| Subject | Char(3) | Subject Code, MA1, RE4, . . . |
| ID | Char(4) | Internal Skill ID. |
| Sequence | Numeric(3) | Natural order of presentation |
| Code | Char(10) | Sylvan code. |
| Name | Char(200) | Skill Name |
| Location | Char(4) | Strand # in first char. |

Description

Table 2 holds a list of all the skills for all the subjects.

Indices

| Name | Fields/Filter | Description |
|---|---|---|
| ID | ID | |
| CODE | Code | |
| SUBJECT | Subject | |

TABLE 3

RP.dbf - FoxPro table.

| Name | Type | Description |
|---|---|---|
| InqNum | Char(4) | Link to RP database (Responsible party). |
| Salutation | Char(10) | Honorific used to make letter salutations. |
| First | Char(15) | First name. |
| MI | Char(1) | Middle initial. |
| Last | Char(25) | Last name. |

Description

Table 3 holds the Responsible Party for the students.

Indices

| Name | Fields/Filter | Description |
|---|---|---|
| INQNUM | InqNum | |
| FULL1 | UPPER(First+MI+Last) | |
| FULL2 | UPPER(Last+First+MI) | |

TABLE 4

Users.dbf - FoxPro table.

| Name | Type | Description |
|---|---|---|
| UserNum | Numeric(5) | Unique number for user. |
| Name | Char(20) | User's name for use in program. |
| Password | Char(15) | Password for user. |
| LTIME | Char(10) | Last login time. |
| LDATE | Date | Last login date. |
| First | Char(15) | First name. |
| MI | Char(1) | Middle initial. |
| Last | Char(30) | Last name. |

Indices

| Name | Fields/Filter | Description |
|---|---|---|
| NAME | Name | |
| USERNUM | UserNum | |
| INIT | Init | |

TABLE 5

Student.dbf - FoxPro table.

| Name | Type | Description |
|---|---|---|
| StuNum | Char(4) | Unique ID for student. |
| InqNum | Char(4) | Link to RP database (Responsible party). |
| First | Char(15) | First name. |
| MI | Char(1) | Middle initial. |
| Last | Char(25) | Last name. |
| GradeDate | Date | |
| BirthDate | Date | Date of birth |
| Sex | Char(1) | M/F |

Indices

| Name | Fields/Filter | Description |
|---|---|---|
| STUNUM | StuNum | |
| FULL1 | UPPER(First+MI+Last) | |
| FULL2 | UPPER(Last+First+MI) | |

Figure 11:
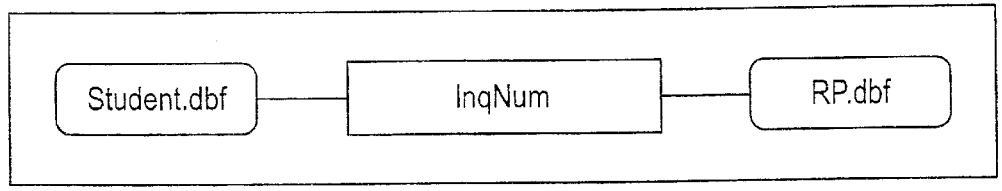
FIG. 11 shows the link between databases Student.dbf and RP.dbf.

FIG. 11 shows the link between databases Student.dbf and RP.dbf.

TABLE 6

Goals.dbf - FoxPro Table.

| Name | Type | Description |
| --- | --- | --- |
| StudentID | Char(4) | Internal STS student id number. |
| Subject | Char(3) | Subject Code. |
| Code | Char(2) | 0: Long, 1: Short |
| Goal | Memo | Goal text. |

Indices

| Name | Fields/Filter | Description |
| --- | --- | --- |
| SSC | StudentID+Subject+Code | |

TABLE 7

SkillMap.dbf - FoxPro Table.

| Name | Type | Description |
| --- | --- | --- |
| Subject | Char(3) | Subject Code |
| OldID | Char(4) | Old skill id. |
| NewID | Char(4) | New skill id. |

TABLE 8

CNTS.dbf - FoxPro Table.

| Name | Type | Description |
| --- | --- | --- |
| StudentID | Char(4) | Internal STS student id number. |
| TestHour | Num(4) | Hour/Session count was dinged. |
| DingDate | Date | Date the record was added to database. |
| Type | Num(4) | Ding Type. Relates to TDingType object. |
| Signature | Char(10) | Security signature based on Center ID, StudentID and Ding Type. |
| BM1 | Num(10) | Bitmap used to stored tested completed. Only valid when Type = diGeneral. |
| BM2 | Num(10) | Date the record was added to database. |

Description

Table 8 holds information about the counts or instruction credits used for a student. For each student, there can be a record for each count(ding) type. For each count type, there can be multiple based on testhour. If a student has a record that matches the StudentID+TestHour+Type, then the a Type count is not removed from the center's count bucket. The Signature field is a calculation based on Center ID, StudentID and Type that should generate a unique number. It is used to deter someone from adding records for students and, therefore, not decrementing the count buckets.

Indices

| Name | Fields/Filter | Description |
| --- | --- | --- |
| STT | StudentID+STR(TestHour,4,0)+STR(Type,4,0) | |

TABLE 9

CntsAccm.dbf - FoxPro Table.

| Name | Type | Description |
| --- | --- | --- |
| TestID | Num(4) | Internal Test ID based on TCountIndex. |
| Total | Num(6) | Total counts used. |
| SLUpLoad | Num(6) | Total counts used since last upload or transfer. |
| LastUpload | Date | Date of last upload or transfer. |

Description

Table 9 keeps track of third party tests administered for accounting purposes so that royalties and so forth may be paid.

Indices

| Name | Fields/Filter | Description |
| --- | --- | --- |
| TestID | TestID | |

TABLE 10

PTT.dbf - FoxPro Table.

| Name | Type | Description |
| --- | --- | --- |
| StudentID | Char(4) | Internal STS student id number. |
| AssessID | Char(4) | Link to Assess.DBF |
| DateSent | Date | date the record was moved to floppy. Initially set to 00/00/00. |

Description

Table 10 holds triggers for use when uploading post test information. When a post test is given, a record is added to this table. At end of a month, the data from all tests can be assembled and analyzed. In this way, the effectiveness of teaching materials and other useful information can be gathered.

TABLE 11

T2KMFcts.db - Paradox Table.

| Name | Type | Description |
| --- | --- | --- |
| MathFactsCtr | Integer | Unique ID number to this record. |
| StudentID | Char(4) | Internal Student ID. Links to Student.dbf.ID field. |

TABLE 11-continued

T2KMFcts.db - Paradox Table.

| Name | Type | Description |
|---|---|---|
| Type | Char(1) | Type: A=Addition M=Multiplication S=Subtraction D=Division |
| MadMinute | Char(200) | Array of flags to define the status of a Math Fact for use with Mad Minute processing. |
| MMWrongCnt | Char(200) | Arrow of wrong answer counts for Mad Minute. Each element will have a value from $20 to $7f where $20 is zero wrong answers. |
| MasterySheet | Char(200) | Array of flags to define the status of a Math Fact for use with Mastery Sheet processing. |
| MSWrongCnt | Char(200) | Arrow of wrong answer counts for Mastery Sheets. Each element will have a value from $20 to $7f where $20 is zero wrong answers. |

Description

Table 11 holds the results for the Math Facts exercise illustrated in FIGS. 9 and 10. Math Facts is made of two sections, Mad Minute and Mastery Sheets. For Mad Minute, the system keeps track of up to three consecutive right answers and the total count of wrong answers. For master Sheets, the system keeps track of the same information. Mad Minute also keeps track of an Assigned status for each entry so the teacher or DE can pre-assign facts (e.g. the 7× portion of the multiplication table) to do before continuing randomly through the list.

The bitmap for each element is as follows:

Bits 1,2: Right answer count 0 to 3.
Bit 3: Assignment bit.
Bit 6: Always true (Makes an empty element equal to a space, ASCII 32=20 HEX).

Indexes

StudentID_Type=StudentID+Type.

Figure 12:
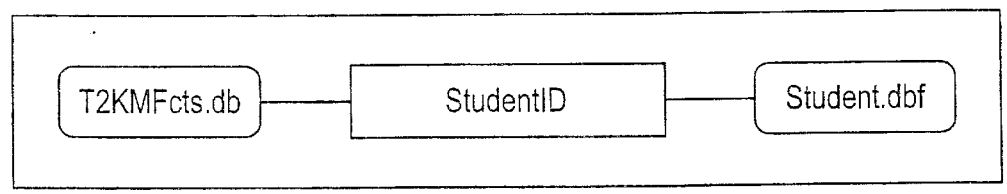
FIG. 12 shows the link between databases T2KMfcts.dbf and Student.dbf.

FIG. 12 shows the link between databases T2KMfcts.dbf and Student.dbf.

TABLE 11

T2KMFSn.db - Paradox Table.

| Name | Type | Description |
|---|---|---|
| MFSessnCtr | Integer | Unique ID number to this record. |
| MathFactsCtr | Integer | Link to the Math Facts table |
| SessionNum | Integer | Session # test was given |
| Type | Char(1) | Type: A=Addition M=Multiplication S=Subtraction D=Division |
| RightCount | Integer | # of right answers |
| WrongCount | Integer | # of wrong answers |

Description

Table 11 contains the results of a Math Facts session. This data is used to keep track of a student's progress, and can be used for depicting this progress graphically or reproducing the results in a parent workbook.

Figure 13:
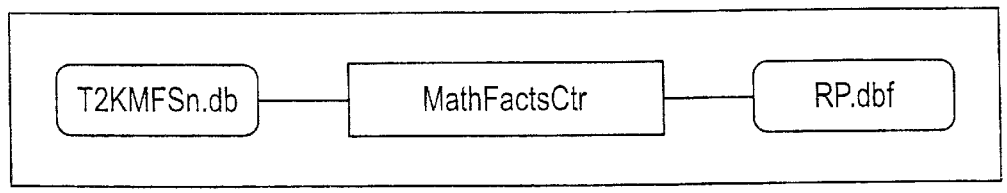
FIG. 13 shows the link between databases T2KMRSn.dbf and RP.dbf.

FIG. 13 shows the link between databases T2KMFSn.dbf and RP.dbf.

TABLE 12

Prescrip.DBF - FoxPro Table

| Name | Type | Description |
|---|---|---|
| StudentID | Char(4) | Internal Student Number. |
| Subject | Char(3) | Subject Code |
| SkillID | Char(4) | Internal Skill ID. Links to Skills.DBF.ID Lookup database. |
| Type | Char(1) | ???? |
| Tested | Char(1) | ???? |
| Status | Char(1) | P = Prescribed by CAT A = Assigned skill manually C = Completed M = Mastered D Dx mastered |
| MHour | Numeric(3) | Session # (hour) skill mastered. |
| MDate | Date | Date skill mastered. |
| Seqno | Integer | 1 to X - order for instruction to be given. |
| GPStart | Integer | Starting session # of GP |
| GPEnd | Integer | Ending session # of GP |
| IPStart | Integer | Starting session of # of IP |
| IPEnd | Integer | Ending session # of IP |
| PSStart | Integer | Starting session # of PS |
| PSEnd | Integer | Ending session # of PS |
| DP1Start | Integer | Starting session # of DP1 |
| DP2Start | Integer | Starting session # of DP2 |
| DP3Start | Integer | Starting session # of DP3 |
| DP4Start | Integer | Starting session # of DP4 |
| DP5Start | Integer | Starting session # of DP5 |
| DPsDone | Logical | True if student has mastered DP's |

Description

Table 12 is used to add new fields to the Ma1Presc.DBF or student profile to support additional data.

Figure 14:
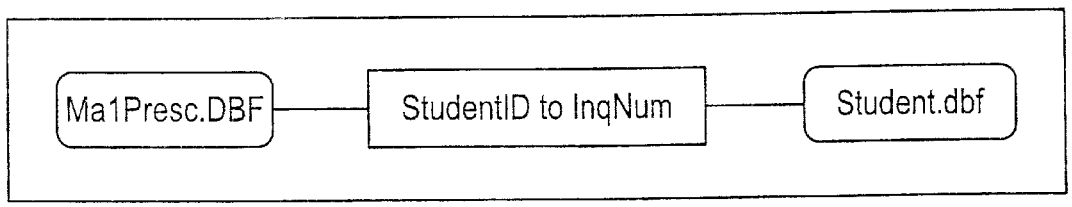
FIG. 14 shows the link between databases Ma1Presc.dbf and Student.dbf.

FIG. 14 shows the link between databases Ma1Presc.dbf and Student.dbf.

TABLE 13

T2KLtDt1.db - Paradox Table.

| Name | Type | Description |
|---|---|---|
| ListDtlCtr | Integer | Unique ID number to this record. |
| StudentID | Char(4) | Internal Student ID. |
| SkillID | Char(4) | Internal Skill ID. |
| PageCtr | Integer | Link to the T2KPgBm.DB pages. |
| PType | Char(4) | Same as T2KPgBm.Ptype field. Used to specify sub-type to SkillID. Eg. 2)S2 IP sets Ptype = 'IP'. Null for RE4 skill's. |
| PageDesc | Char(100) | Description of page when not linked, via PageCtr, to the T2KPgBm table. |
| Score | Numeric | Score for details that require scoring (REAL). −9999 = Item not completed. Set when the sequence is set by DE but item has not been completed. |

TABLE 13-continued

T2KLtDt1.db - Paradox Table.

| Name | Type | Description |
|---|---|---|
| ErrorAnalysis | Char(1) | Analysis for the test entered by the teacher.<br>'*' = No Error<br>'A' = Computational<br>'B' = Conceptual<br>'C' = Missing Step<br>'D' = Random Error |
| SessionCnt | Integer | Session # the test was given. |
| SequenceNum | Integer | The sequence which items for a specific PageCtr skill. Set by the DE module to define the order of material for a student. |
| Available | Logical | If available for use. The DE can set this material as 'Not to be used' by setting this to FALSE. |

Description

Table 13 is used to link scores to work done by a student. The results of the work can be for pages stored in the T2KPgBm table, linked by the PageCtr field or work done off the computer. The teacher enters a description for the work in PageDesc. Internally, the work is linked to the subject via the SkillID and PType fields. If the Score field is −9999, the work has not been done but the record was created by the DE Module to provide directions for the teacher. The teacher module will display the items in the order of SequenceNum for all items where SequenceNum>0. All zero items will be displayed last in no particular order.

Indices

| Name | Fields/Filter | Description |
|---|---|---|
| StudentID_SkillID_PC | StudentID + SkillID + PageCtr | |

Figure 15:
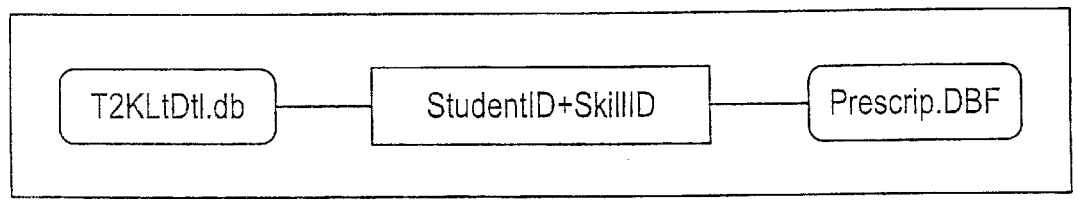
FIG. 15 shows the link between databases T2KLtDtl.dbf and Prescrip.dbf.

FIG. 15 shows the link between databases T2KLtDtl.dbf and Prescrip.dbf.

TABLE 14

T2KPgBm.db - Paradox Table.

| Name | Type | Description |
|---|---|---|
| PagesCtr | Integer | Unique ID number to this record. |
| Subject | Char(4) | Subject (MA1, . . . ) |
| SkillID | Char(4) | Internal Skill ID for page |
| PType | Char(4) | Type of Page (DC, IP, GP, PS, DP). DC = Description on Skill Card. |
| AnswerKey | Boolean | True or False if page is answer key. |
| Description | Char(40) | Text description of page. |
| PNotes | Memo | Notes to the teacher about page. |

TABLE 14-continued

T2KPgBm.db - Paradox Table.

| Name | Type | Description |
|---|---|---|
| PageData | Blob | Blob data holding all the information about the page(s). |
| AnswerToPage | Integer | Question page where this page holds the answers. |

Description

Table 14 holds the pages information. Page Information can be bitmap images, ASCII text or Rich Text. The file is indexed on Subject+SkillID+Type.

Indices

| Name | Fields/Filter | Description |
|---|---|---|
| SubjectSkillType | Subject + SkillID + PType | |

'PageData' Field Description

The 'PageData' field holds all the information about the page(s). This is a stream of binary data that is parsed by the application into bitmap images, text data and question area's.

The stream is made up of the following parts:

1? TPageHeader—Contains the version of the stream. Current version is 1.
2? TPageImageArray—1 to X TPageImage's.
3? TQuestMarkerArray—0 to X TQuestMarker's

TABLE 15

T2KCmLg.db - Paradox Table.

| Name | Type | Description |
|---|---|---|
| CommLogCtr | Integer | Unique ID number to this record. |
| StudentID | Char(4) | Internal Student number. |
| SessionCtr | ShortInt | Session for the communication log entry. |
| Date_Time | TimeStamp | Date/Time of the session |
| Motivation | ShortInt | Number value 1 to 5. |
| Speed | ShortInt | Number value 1 to 5. |
| Concentration | ShortInt | Number value 1 to 5. |
| Subject | Char(4) | Subject used for this session (MA1, Homework . . . ) |
| Workload | ShortInt | Number value 1 to 3.<br>1 = Needs more work,<br>2 = Adequate work,<br>3 = Needs less work. |
| FinishedWork | Boolean | True or False |
| NeedsAttention | Boolean | True or False |
| Notes | Memo | Memo field for free form text. |

Description

Table 15 illustrates how each session is assigned a communication log entry. The DE or Teacher can enter notes about how the student performed during a particular session.

| Indices | | |
|---|---|---|
| Name | Fields/Filter | Description |
| StudentID_Date Time | StudentID+DateTime | |
| StudentID_SessionCtr | StudentID+SessionCtr | |

TABLE 16

T2KSpcNt.db - Paradox Table.

| Name | Type | Description |
|---|---|---|
| SpecNtsCtr | Integer | Unique ID number to this record. |
| StudentID | Char(4) | Internal student number. |
| Notes | Memo | Memo field for free form text. |
| SessionCtr | Integer | Last session note was reviewed. |
| OneTime | Boolean | Is special note one time or for each session. |
| Reviewed | Boolean | True or False. Did teacher review this entry. |
| MustReview | Boolean | True or False. Teacher must review before continuing with session. |
| AddedBy | Integer | User # in Symplicty Users.DBF file of user/employee who added the note. |
| DateAdded | TimeStamp | Date/Time the special note was added. |

Description

Table 16 holds notes from the DE for the teacher to review each session. The note can be setup to be reviewed each session or as a one time note that is seen and never seen again.

| Indices | | |
|---|---|---|
| Name | Fields/Filter | Description |
| StudentID_Date Added | StudentID+DateAdded | |

TABLE 17

T2KStns.db - Paradox Table

| Field Name | Description |
|---|---|
| StnsCtr | Unique ID number to this record. |
| Type | Type of record S=Student, T=Teacher |
| Address | TCP/IP address of station |
| Comment | Comment about station |
| TeacherNum | If Type = 'S', this is RecCtr of teacher student belongs. |
| StudentNum | If Type = 'S', this is student number around the table, 1 to 3. |

Description

Table 17 is used by the Teacher and Student programs in one embodiment to link to each other via TCP/IP. In the preferred embodiment, the Teacher looks up her students and contacts them via WinSock.

TABLE 18

T2KMaPgs.db - Paradox Table

| Field Name | Description |
|---|---|
| SkillCtr | Unique ID number to this record. |
| SkillID | Internal Skill ID |
| PageType | Type of page described here.<br>0: Introduce Skill<br>1: Demo throught GP<br>2: Gp Tests<br>3: IP Tests<br>4: PS Tests<br>5: Drill & Practice Tests<br>6: DP Tests |
| PageSubType | Sub-type of page.<br>1 to X: Index to tests<br>−1 to −X: Index to answers |
| DisplayType | Type of display for this record:<br>0: Bitmap File<br>1: Offset inside compressed bitmap file.<br>2: Text File<br>3: Offset inside compresssed text file |
| FileName | Name of bitmap or test file. |
| StartOffset | Starting offset inside compressed file. |
| EndOffset | Ending offset inside compressed file. |
| DisplayDescription | Description of this record for display purposes |

Description

Table 18 is used in the Instruction screen when a teacher selects an item from the student's prescription. Based on the selection, the teacher can view the material and optionally send it to the student's workstation. The message formatting to the student workstation allows the student program to load the desired page without access to the database tables. The teacher program will pass the information, such as file names and offsets to the student program.

If SkillID='VERS', then PageType is the version of the database. This database is modified along with the corresponding bitmap and text as needed. It is preferred that there be a feature in the DE's program to display the version of this file as it is the heart of the prescription/teacher/student teaching.

An index on SkillID+PageType+PageSubType allows quick access to the desired page.

TABLE 19

T2KITAct.DB - Paradox Table.

| Name | Type | Description |
|---|---|---|
| Code | Char(10) | Code for Item |
| StudentID | Char(4) | Internal Student Number. |
| UnitCount | Numeric(8, 2) | # of units used |
| When | TimeStamp | Date/Time the item was used for the student. |

Table 19 holds contains a accounting of all items used by the Center. There is a link to which student used the item and how many units should be billed.

| | Indices | |
|---|---|---|
| Name | Fields/Filter | Description |
| Code | Code | |
| Sc | StudentID + Code | |

Teacher/Student Messages

All messages are passed to/from Teacher Station to Student Station using files.

Messages are ASCII using the following general format:
Header: TEACH2K V1.00
Message: <Message token here>
Data: <Data Type>
<Message Data Here>
END A single key word is passed on the Message Line. The receiving program processes the Data section based on the message. The version is placed in the header to provide a mechanism for two software pieces to know they are speaking the same language. If the receiving station doesn't understand the header, it ignores the message.

<Data Type> specifies the type of data being received. ASCII is raw ascii data. BITMAP is a formatted bitmap file. If type is 'BINARY' the size of the binary data is placed after the word 'BINARY'.

Display Text Page
Header: TEACH2K V1.00
Message: ShowTextPage
Data: ASCII
<FileName.EXT><Start Byte Offset><End Byte Offset>
END Display Bitmap File
Header: TEACH2K V1.00
Message: ShowBitmapFile
Data: ASCII
<FileName.EXT>
END Display Text File
Header: TEACH2K V1.00
Message: ShowTextFile
Data: ASCII
<FileName.EXT>
END Run External Program
Header: TEACH2K V1.00
Message: RunProgram
DATA: ASCII
<Program Executable to Run.EXE>
<Directory to Run In>
END Close All External Programs.
Header: TEACH2K V1.00
Message: CloseExternalPrograms
Data: NONE
END Show Page on student's workstation
Header: TEACH2K V1.00
Message: ShowPage
Data: ASCII
<PageCtr from T2KPgBM.DB database>
END Get written answers from the student's workstation
Header: TEACH2K V1.00
Message: GetAnswerBlock
Data: ASCII
<Question number 0–X>
END Returned answer from student's workstation to teacher
Header: TEACH2K V1.00
Message: ReturnAnswer
Data: BINARY <RecordSize>
RECORD STRUCT
    QuestionNumber:Integer;
    BitmapDataSize:LongInt;
    BitmapData: BLOB;
ENDRECORD
END Single Flash Cards
Header: TEACH2K V1.00
Message: FlashCardsSingle
Data: ASCII
<Number1>
<Number2>
<Operand>; A, S, M, D
END Student Reset—Put student module back on signon panel
Header: TEACH2K V1.00
Message: ResetStudent
Data: ASCII
END STS.INI file The STS.INI file located in the \WINDOWS directory of all STS/T2K systems is used to specify setup information unique to the Student or Teacher workstation. An example STS.INI file is as follows:

[Database]
; Path=C:\PROGRAM~1\SUCCESS~1\DATA200
Path=C:\SylvnDev\Teach2~1\DataT2K
T2Kpath100=C:\SylvnDev\Teach 2000\DataT2K
T2KmsgPath=C:\SylvnDev\Teach 2000\Msgs
[T2K]
Table=1
Student=1

If the station is not a Student computer, the [T2K] Student entry is not required.

Information passed to/from Student 1 and Table 1 would be placed in a directory, for example, "C:\SylvnDev\Teach 2000\Msgs\Table1\Student1". In this directory are two .INI files, T.INI for the teacher and S.INI for the student. An .INI file example:

[Msgs]
NextSendMsg=1
NextRecvMsg=1

The Msgs section has two values 'NextSendMsg' and 'NextRecvMsg'. When the Teacher wants to send a message to the Student, the Teacher program reads [T.INI][Msgs] NextSendMsg to get the number of the next message to send. It writes a file named 'S00001.$$$' and increments the

[T.INI][Msgs]NextSendMsg. The Student program has a thread running looking for the [S.INI][Msgs]NextRecvMsg number. Likewise, the Teacher program has three threads running, one for each student. It watches for the file numbered [T.INI][Msgs]NextRecvMsg to appear.

Overview of Method and System

The automated computer-based student management and instructional materials delivery method and system according to the present invention assists in tutoring activities including instructional materials delivery, student progress tracking, student testing, and management.

Specifically, the system automates the instructional materials delivery, student records, and progress tracking functions in a computer-based system. The primary unit comprises a teacher workstation 20 and student workstations 22 disposed in a single U-shaped table 25, as shown in FIG. 2. A number of students 23 and one teacher 21 will work at each table 25. The teacher as well as each of the students at the table 25 will have a workstation 20,22, a pen-based display tablet connected to the server and central processing unit 10. The student workstations 22 and teacher workstations 20 are networked and can be housed in a single system unit, or multiple, small stacked enclosures. The teacher has a small keyboard (not shown in FIG. 2) in addition to a pen-based computer display and input.

The teacher uses his/her pen-based tablet workstation 20 to view the teacher workbook generated by the student profile for each student at the table 25. With a tap of the computer pen stylus, a teacher can view the detailed prescription, or assembled set of instructional materials, for any profile item. Once the teacher selects a prescription or particular instructional material, a graphic image of the textbook, worksheet or problem set is sent to the student workbook and displayed on the student workstation 22 or pen-based tablet. The student can write on their own workstation 22, work through problems, make notes, and do the tasks assigned by the teacher. The teacher can read what the students have written at any time, and can archive or print the student's work as needed. Finally, the teacher can update the student's profile showing work completed, scores on mastery tests (DPs), and other notes.

The system also enables students to use interactive multimedia instructional software to reinforce, practice, and assess skills or learning objectives. Each student workstation comprises a standard PC capable of running off-the shelf software.

The present invention meets the goal of developing a new automated instructional material delivery and student management system to replace the book-and-paper materials and manual records.

The system and method of the invention facilitates instructional delivery, manages and tracks student progress, delivers assessment and diagnostic test batteries through an automated system and provides additional practice and learning opportunities for students. The system reduces instructional support time and costs, increases a teacher's capacity to work with additional students at the same time. This efficiency generates new revenues for learning centers incorporating the system, thereby increasing profits. By tracking student progress through each instructional hour, the system supports accurate program, teacher, materials, and effectiveness studies. The system streamlines administration, reduces paperwork and eliminates redundant record keeping. The system is engaging to students, thus increasing enrollment and the period of time a student remains enrolled, facilitating new product development in instructional materials, enhancing quality control, and improving data collection.

The system of the invention enables teachers to deliver instructions with greater quality. Teachers can be given automatic, expert guidance and recommendations resulting in increased educational standards.

The system provides all instructional materials on hand whenever they are needed, the right materials can be given to students when they need it. Those materials which prove to be most successful with various students can be automatically favored by the system.

The system also delivers all instructional materials in a timely manner. Record keeping and student tracking is automatic, and student workbooks will be complete, up-to-date, and appropriately tracked. The system automatically links comments and notes between the teacher and Director of Education, and any documentation required for parent conferences, for example, are automatically maintained.

The system enables educational or learning centers to be responsive to state and local needs, course material or software additions and changes, as well as customer and center requirements.

The system is flexible and adaptive, it delivers appropriate materials to suit teacher, school or center, and student needs. The system delivers book, worksheet, and notebook pages, as well as instructional, simulation, practice, or other software. New courses and materials can be readily incorporated into the curriculum by updating the system software without extensive operation or training changes.

State or local course differences, competencies, or other requirements and materials can be readily accommodated by the system. The system provides consistent administration and enables customization and enhancement for materials delivery, course content, initial and on-going assessment, and new skill development.

The system can be utilized to support corporate, franchise and contract-services learning centers by providing a more marketable instructional delivery model.

The system is streamlined, and offers an efficient, automated student tracking, instructional delivery and administration environment. Records are easier to maintain and use for center staff, and easier to understand and appreciate for parents.

New curriculum materials and methods are quickly added or updated in centers on a small or large scale through software updates. New modes of assessment and practice are also incorporated into the system with minimum training and expense.

The system enables a teacher to work with three or more students at a time while maintaining a preferable standard three-to-one ratio. A fourth student, for example, could run computer simulation or practice while three other students are engaged in a typical learning course. Every four hours, for example, a student could rotate through a non-supervised "software" hour and gain valuable skill-building support.

The system is operated in a consistent manner using automation, and teachers or learning center personnel no longer have to pull materials, move around student notebooks, or duplicate student records.

The system reduces costs because instructional materials are loaded as software or electronically stored data and learning center staff do not have to pull or re-file books. Records are maintained automatically and data does not have to be re-copied or transferred.

The system tracks instructional materials delivered to students, and calculates, if necessary, cost information for billing students or the learning center for compensating owners of copyrighted instructional materials or some other source of the materials, such as a main corporate office.

The system automatically captures and reports all relevant testing information. Pre-test and post-test data collection and reporting are streamlined. Demographic information and skill gaps can be tracked by region, or other characteristic, providing useful statistical data and marketing information.

Because the system is a computer-administered test battery, it delivers a consistent, thorough, high-quality test.

Learning centers can be prevented from altering or skipping steps in the test battery using the system of the present invention. All phases of administration, scoring, diagnosis and prescription-writing can be standardized and delivered in a consistent way.

While the present invention has been illustrated by a number of preferred embodiments, one of ordinary skill in the art will recognize that deletions, additions, modifications and improvements can be made while remaining within the scope and spirit of the appended claims.

What is claimed is:

1. A method for instructing a student comprising:
    establishing a learning session between a teacher and a student;
    generating a teacher workbook and a student workbook that is different from the teacher workbook,
    displaying at least one instructional material on the teacher workbook and the student workbook,
    wherein the teacher workbook and the student workbook have corresponding interfaces for use by the teacher and student, respectively, to interact with each other during the learning session.

2. The method of claim 1, wherein the learning session uses at least one of a notebook user environment metaphor, a classroom user environment metaphor, and a school house user environment metaphor.

3. The method of claim 1, wherein the student workbook is used for at least one of accessing an instructional material, delivering an instructional material to a student workstation, storing a student input, storing a student response, retrieving a student input, forwarding a student input to a teacher workstation and forwarding a student input to a central station.

4. The method of claim 1, wherein an instructional material is displayed concurrently on the teacher workbook and student workbook.

5. The method of claim 1, further comprising forwarding an instructional material to the student workbook in response to a teacher command.

6. The method of claim 1, wherein an instructional material is displayed based on a student profile comprising at least one of a stored input, a collected input, a previously assessed data, and a skill gap.

7. The method of claim 1 further comprising storing teacher notes taken during the learning session.

8. The method of claim 1 further comprising using the teacher workbook to select instructional material during the learning session.

9. The method of claim 1, wherein at least one of the teacher workbook and the student workbook are generated by running a program supplied from a central station.

10. The method of claim 1, wherein instructional material is supplied from a central database.

11. The method of claim 1 further comprising assigning a teacher privilege to the teacher with respect to the student.

* * * * *